United States Patent
Morabit

(10) Patent No.: US 12,029,160 B2
(45) Date of Patent: Jul. 9, 2024

(54) GLIDER ASSEMBLY FOR HANDHELD TRIMMERS

(71) Applicant: Aero-Flex Technologies, Inc., Rock Hill, SC (US)

(72) Inventor: Vincent D. Morabit, Rock Hill, SC (US)

(73) Assignee: AERO-FLEX TECHNOLOGIES, INC., Rock Hill, SC (US)

( * ) Notice: Subject to any disclaimer, the term of this patent is extended or adjusted under 35 U.S.C. 154(b) by 748 days.

(21) Appl. No.: 16/420,422

(22) Filed: May 23, 2019

(65) Prior Publication Data

US 2019/0274246 A1    Sep. 12, 2019

Related U.S. Application Data

(62) Division of application No. 14/280,916, filed on May 19, 2014, now Pat. No. 10,368,487.

(60) Provisional application No. 61/877,493, filed on Sep. 13, 2013, provisional application No. 61/824,657, filed on May 17, 2013.

(51) Int. Cl.
*A01D 34/416* (2006.01)
*A01D 34/90* (2006.01)

(52) U.S. Cl.
CPC ......... *A01D 34/902* (2013.01); *A01D 34/416* (2013.01)

(58) Field of Classification Search
None
See application file for complete search history.

(56) References Cited

U.S. PATENT DOCUMENTS

| | | | |
|---|---|---|---|
| 2,724,229 A | | 11/1955 | Graham |
| 4,254,550 A | * | 3/1981 | Satoh ................. A01D 34/4161 30/276 |
| 4,512,143 A | * | 4/1985 | Jimenez ................. A01G 3/062 56/DIG. 18 |
| 4,829,755 A | | 5/1989 | Nance |
| 4,922,694 A | | 5/1990 | Emoto |
| 5,174,027 A | * | 12/1992 | Gusthalin ............ A01D 34/416 30/104 |
| 5,317,807 A | | 6/1994 | Pulley |
| 5,367,862 A | | 11/1994 | Spear |
| 5,408,816 A | * | 4/1995 | Cartier ................. A01D 34/001 56/DIG. 18 |

(Continued)

FOREIGN PATENT DOCUMENTS

EP    1174017 A1 *    1/2002    ........... A01D 34/416

OTHER PUBLICATIONS

EZ-Glide Pro Trimmer Weed Eater Attachment, Trimming Made Easy, http://www.youtube.com/watch?v+KYwqRfAUXqU, Jul. 31, 2013, 2 pp.

(Continued)

*Primary Examiner* — Adam J Behrens
(74) *Attorney, Agent, or Firm* — NIXON & VANDERHYE P.C.

(57) ABSTRACT

A glider assembly for a handheld trimmer includes a glider shaft coupleable at one end with a rotating head of the handheld trimmer, and a glider plate connected to an opposite end of the glider shaft. The glider plate is part-spherical or saucer shaped and includes a concave side and a convex side. A bearing acts between the glider plate and the glider shaft. The assembly enables an operator to rest the weight of the trimmer on the ground during use while controlling a cutting height.

14 Claims, 7 Drawing Sheets

(56) References Cited

U.S. PATENT DOCUMENTS

| | | | |
|---|---|---|---|
| 5,450,715 A | 9/1995 | Murray | |
| 5,459,985 A | 10/1995 | Gedert | |
| 5,477,665 A * | 12/1995 | Stout | A01D 34/416 56/16.7 |
| 5,626,006 A | 5/1997 | Fricke, Sr. | |
| 5,836,142 A | 11/1998 | Maxwell | |
| 5,836,227 A | 11/1998 | Dees, Jr. | |
| 5,852,876 A | 12/1998 | Wang | |
| 5,906,051 A * | 5/1999 | Nannen | A01D 34/4163 30/276 |
| 5,996,233 A * | 12/1999 | Morabit | A01D 34/4168 30/276 |
| 6,032,369 A | 3/2000 | Tada | |
| 6,314,848 B2 * | 11/2001 | Morabit | A01D 34/4166 83/13 |
| 6,516,598 B1 | 2/2003 | Notaras et al. | |
| 6,604,349 B2 | 8/2003 | Deal | |
| 6,666,009 B1 * | 12/2003 | Brandon | A01D 34/4166 30/276 |
| 6,675,565 B2 | 1/2004 | Appleyard | |
| 6,722,040 B2 | 4/2004 | Sullivan | |
| 6,912,789 B2 | 7/2005 | Price, III | |
| 6,971,223 B2 * | 12/2005 | Scott | A01D 34/74 30/276 |
| 7,036,297 B2 | 5/2006 | Popp | |
| 7,216,471 B1 | 5/2007 | Hassan | |
| 7,222,476 B2 | 5/2007 | Hishida | |
| 7,302,790 B2 | 12/2007 | Brandon | |
| 7,360,350 B1 * | 4/2008 | Smith, Jr. | A01D 34/416 56/12.7 |
| 7,617,661 B2 | 11/2009 | Faeldan | |
| 7,624,559 B2 * | 12/2009 | Hishida | A01D 34/902 30/276 |
| 7,661,252 B2 * | 2/2010 | Kitamura | A01D 34/4166 56/12.7 |
| 7,827,771 B2 * | 11/2010 | Hishida | A01D 34/902 30/276 |
| 8,418,371 B2 * | 4/2013 | Hoelscher | A01D 34/90 30/276 |
| 10,064,329 B1 * | 9/2018 | Lovmark | A01D 34/4167 |
| 2002/0007559 A1 * | 1/2002 | Morabit | A01D 34/416 30/276 |
| 2002/0189221 A1 * | 12/2002 | Morabit | A01D 34/001 56/12.7 |
| 2003/0005674 A1 | 1/2003 | Powell | |
| 2003/0041578 A1 | 3/2003 | Fuller | |
| 2004/0148784 A1 | 8/2004 | Grace | |
| 2005/0006862 A1 | 1/2005 | Courson | |
| 2010/0101099 A1 * | 4/2010 | Morabit | A01D 34/416 29/428 |
| 2011/0232436 A1 | 9/2011 | Morabit | |
| 2011/0308218 A1 * | 12/2011 | Dunn | A01D 34/67 56/16.7 |
| 2012/0073146 A1 * | 3/2012 | Hebert | A01D 34/4167 30/286 |

OTHER PUBLICATIONS

Trimmer Support, http://trimmersupport.com/, Accessed on Jul. 29, 2013, 3 pp.

* cited by examiner

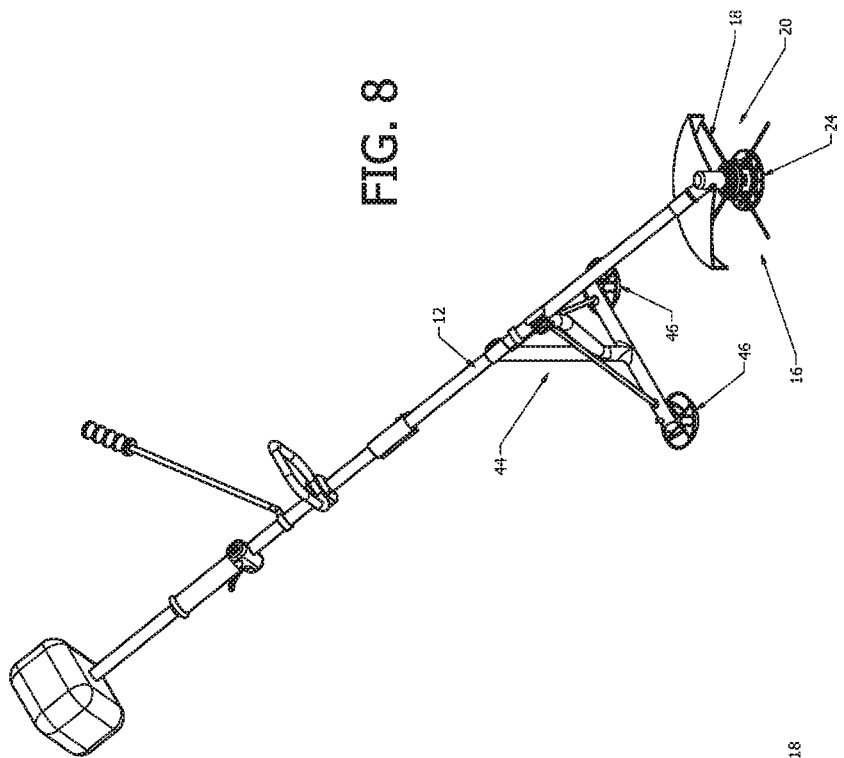
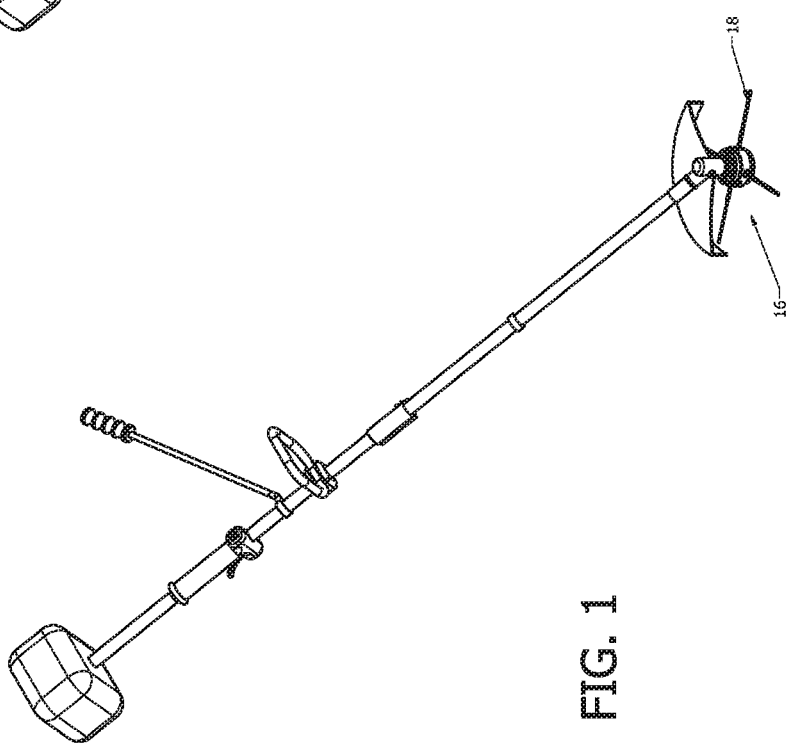

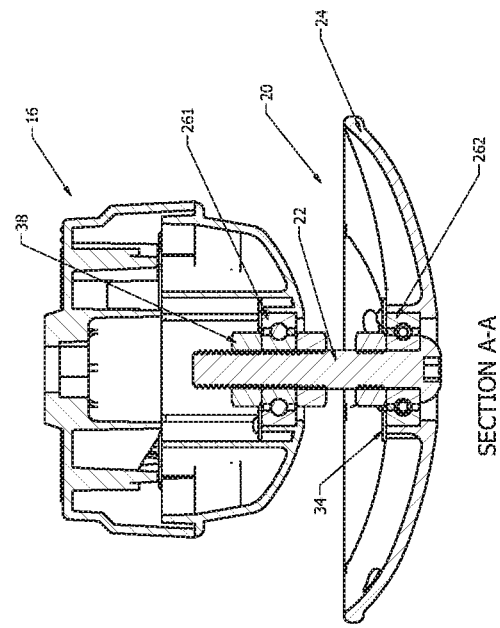
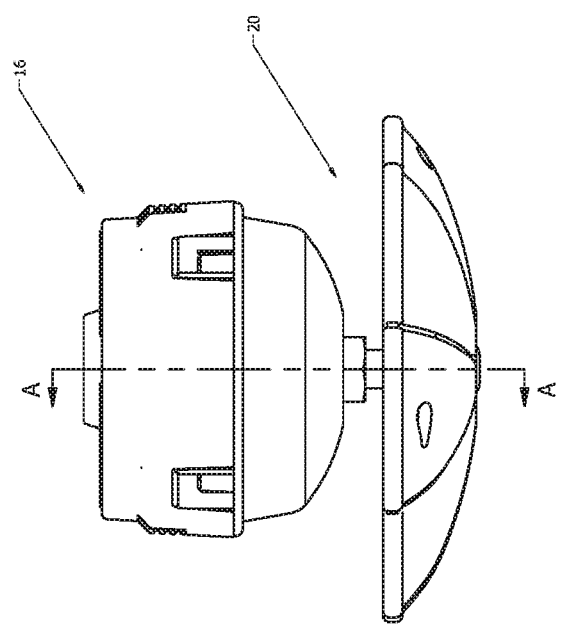

SECTION A-A

GLIDER ASSEMBLY FOR HANDHELD TRIMMERS

CROSS-REFERENCES TO RELATED APPLICATIONS

This application is a divisional of U.S. patent application Ser. No. 14/280,916, filed May 19, 2014, pending, which claims the benefit of U.S. Provisional Patent Application No. 61/824,657, filed May 17, 2013, and U.S. Provisional Patent Application Ser. No. 61/877,493, filed Sep. 13, 2013, the entire content of each of which is herein incorporated by reference.

STATEMENT REGARDING FEDERALLY SPONSORED RESEARCH OR DEVELOPMENT (NOT APPLICABLE)

BACKGROUND

The invention relates generally to handheld trimmers and, more specifically, to handheld trimmers incorporating glider supports in various configurations.

Existing handheld trimmers typically utilize gas powered, AC or DC motors and a monofilament cutting line with a regular (constant) cross section (typically a circular cross section). The trimmers are fully operator supported to try to keep the cutting line away from harmful objects that lie on or protrude from the ground. Some operators may rest the head on the ground to trim an edge closely and to relieve trimmer weight, but these actions result in wearing away the base of the head and cause skidding thrust forces from ground contact that create scalping and uneven cuts resulting from poor control of normal operating forces.

The thin monofilament cutting line requires very high speed to cut (e.g., tip speeds in the range of 25,000-30,000 ft/min). The existing monofilament cutting lines tend to break easily due to high speed impacts causing overstress failures, thereby needing constant replenishment. When common bumping mechanisms are needed to advance or replenish broken line, the operator often gouges the grass leaving an unsightly scar into evenly cut or "just-mowed" grass. To prevent this scalping, the operator must move away from the cutting zone to find a place to bump advance the head on the ground.

The use of a trimmer is desirably handheld to keep it away from the adversities of ground contact. When trying to use the head while resting on the ground to relieve weight and/or as a stabilizing means to control cutting height, the operator has very little control of the trimmer due to unwanted thrusting and skidding. Further, the base of the head grinds off, which defeats the bumping requirement for replenishment. This results in an expensive head replacement and further operator frustration.

Monofilament cutting line remains impractical for properly mowing grass. As noted, the line requires very high speeds. The line cuts only at the outer tip of the swath and does not cut on the radial face like a blade. The line suffers from high air drag loss that makes it very inefficient. It also lacks inertia and momentum due to its low mass. Monofilament line folds back very easily because it has little supporting structure other than centrifugal force. At speeds less than 24,000 ft/min., monofilament line is typically referred to as a "wet noodle" with ever decreasing cutting ability. Due to its flimsy nature, the monofilament line is easily deflected upward by the grass it is intended to mow, leaving an irregular cut height. The line cannot lift and hold the grass for a supporting cut, is very dull and mashes the grass (instead of cutting it) leaving final cut edges of the grass in an unacceptable quality. Although attempted numerous times over the years, a rotary mowing application with a monofilament line has never been successful.

BRIEF SUMMARY

An object of the preferred embodiments is to provide a fully controllable, efficient, low cost, ground supported trimming and mowing device that mows best with flexible line blades while maintaining the operation of using the trimmer as a handheld tool. The mower/trimmer equipped with the glider assembly of the preferred embodiments offers new features previously unavailable to the market. It is easily maneuvered on the ground by the operator with minimal force and work.

The assembly overcomes the drawbacks in monofilament cutting line and handheld grass trimmers. The combination extends the field of use of the grass trimmer making it a viable ground supported rotary motor without sacrificing current operating features of a handheld grass trimmer. Power requirements are reduced, there is no chute to clog, there is no rigid metal blade, in some embodiments there are no wheels, and the assembly is capable of cutting bigger and heavier vegetation. The glider assembly rests the trimmer on the ground to effectively control the trimmer's weight and frees the handheld trimmer from many undesirable operating forces that are difficult or nearly impossible to control. The assembly allows for complete freedom of movement on the ground's surface in virtually all directions.

Additionally, the use in some embodiments of molded and shaped flexible line blades provides additional advantages to the assembly in combination with the glider assembly structure. The line blades provide for an updraft to lift the grass prior to cutting while also including sharper cutting edges. Power consumption efficiencies are improved, and the control plane is visible to the operator, thereby extending life to have better means to avoid damaging obstacles. The more substantial line blades provide greater kinetic energy for cutting, and efficient cutting can be achieved at lower tip speeds. The blades also provide for lower air drag, which further saves power for more line blade outlets.

The preferred embodiments use one or more bearings to isolate a properly shaped glider plate from rotational power to become a stable grass trimmer ground-supporting means, enabling freewheeling around the central vertical axis of a single zone ground support. The assembly may be used in concert with flexible cutting line, preferably, Aero-Flex® line blades (molded or formed from extrusions), available from Aero-Flex® Technologies Inc. in Rock Hill, SC. The combination answers many of the deficiencies and limitations of other vegetation cutting products referred to as walk behind rotary mowers, handheld brush cutters, hover mowers, handheld trimmers, field mowers, and the like. This includes reductions in operator carry weight and maneuvering forces, power normally required, injury risks and hazards, operating force reactions eliminated to improve control, vibration, noise, wear of cutting members, and more. It provides the needed solutions for the operator to better control the problematic operating forces associated with the use of flexible line cutting devices for handheld grass trimmers, and now ground supported grass trimmers. It expands the grass trimmer into refined rotary mowing applications. It relieves the operators from numerous operating forces that create strain and added effort in operating a grass trimmer to include weight reduction, cantilevered operator holding forces and strain, product weight, thrust and skidding forces from rotating head contact, reduction of thrown objects, and more.

The bearing isolated glider plate is freewheeling, thus eliminating loss of control from skidding caused by thrust forces from head frictional ground contact. It eliminates head wear and dramatically reduces line blade wear because it elevates the rotating head and cutting line above the objects that cause rapid damage and failure. The freewheeling feature is better performed with the specially contoured and shaped glider plate that dramatically reduces the effort needed to move or push the glider assembly supported grass trimmer's opposing weight and operating forces through the heavier grass resistance intended to be trimmed or mowed. The grass trimmer can now more safely reach hazardous areas needing trimming and mowing without the use of metal blades and their associated restrictions (mower decks, restrictive wheels, heavy weight, bulky, strenuous, cutting tools).

The glider assembly also enables the tremendous advantages of the Aero-Flex® line blade's superior structures, as well as its grass lift features to make the grass trimmer a very useful mower and trimmer tool. The glider assembly enables the grass trimmer to be controlled with Aero-Flex® line blades to achieve their high potentials of flexible line blade mowing with sharper cutting edges and grass supporting updraft for efficient and high quality mowing. This novel technology answers the long sought-after flexible line blade/glider assembly combination that successfully mows, trims, edges, as an accurate ground supported rotary mower that is applicable to both gas and electric trimmers while maintaining the option of operating the trimmer as a handheld tool.

In an exemplary embodiment, a glider assembly is provided for a handheld trimmer including a rotating head that supports a cutting line. The glider assembly includes a glider shaft coupleable at one end with the rotating head, and a glider plate connected to an opposite end of the glider shaft. The glider plate is part-spherical or saucer shaped and includes a concave side and a convex side. A bearing acts between the glider plate and the glider shaft.

One end of the glider shaft may include a quick connect coupling engageable with a corresponding coupling on the rotating head. The glider shaft may be a threaded connector. In this context, the bearing may be secured to the glider plate, where the threaded connector is clamped (coupled) through the bearing. The assembly may include a bearing set with a first bearing and a second bearing. In this context, the first bearing may be secured to the glider plate and coupled with the glider shaft, and the second bearing may be secured to the rotating head and coupled with the glider shaft.

The bearing may be structured and cooperable with the glider plate such that the glider plate is free spinning and disconnected from influence by the rotating head. The glider plate may be configured to support a weight of the handheld trimmer during operation of the handheld trimmer.

The assembly may also include a convertible cap attachable directly to the rotating head and disposed between the glider shaft and the rotating head such that the glider shaft is coupleable with the rotating head through the convertible cap. In this context, the convertible cap may offer the optional use of conventional line for trimming with the glider assembly, while it may also include channels for supporting one or more molded cutting line blades. The assembly may also include the molded cutting line secured in the channels of the convertible cap.

In another exemplary embodiment, a handheld trimmer includes a trimmer shaft, a motor attached to the trimmer shaft, a rotating head supporting a cutting line coupled with the motor and attached to the trimmer shaft, and the glider assembly connected to the rotating head.

The handheld trimmer may also include a support leg attached to the trimmer shaft and a supporting glider plate attached to the support leg. The support leg and supporting glider plate together with the main glider plate may define a support base for the handheld trimmer. In one arrangement, two supporting glider plates are attached to the support leg.

The main glider plate may be selectively positionable relative to the rotating head to adjust a cutting height of the cutting line. The cutting line may be extruded, extruded and shaped, or molded into multiple shaped zones. In this context, the motor may be less than 1 HP and may be battery powered.

In yet another exemplary embodiment, a method of operating a handheld trimmer includes the steps of (a) operating the motor to drive the rotating head; and (b) during step (a), setting the glider plate on the ground and supporting or reducing a weight of the handheld trimmer on the glider assembly. The method may also include setting a cutting height of the cutting line plane by adjusting a position of the glider plate relative to the rotating head. Step (a) may be practiced by operating the motor such that a tip speed of the cutting line is 14000-21000 ft/min.

BRIEF DESCRIPTION OF THE DRAWINGS

These and other aspects and advantages will be described in detail with reference to the accompanying drawings, in which:

FIG. 1 shows an exemplary handheld trimmer;

FIGS. 2-5 show variations of a glider assembly and its connection to the rotating head;

FIG. 8 shows a ground supported trimmer.

DETAILED DESCRIPTION

Figure 3:
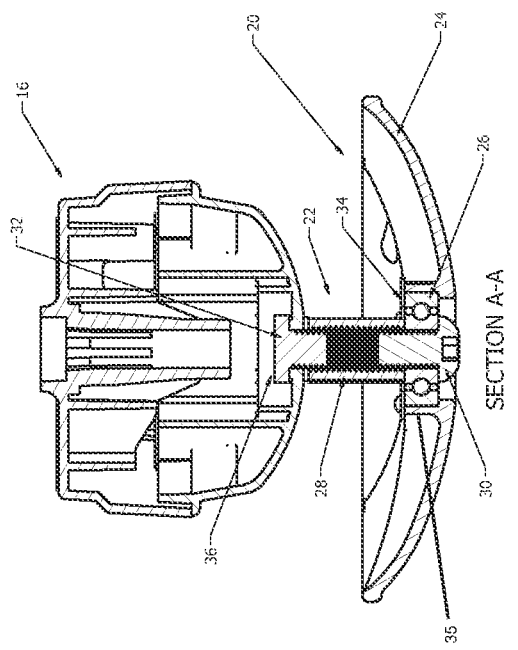

FIG. 1 shows an exemplary handheld trimmer 10. The handheld trimmer 10 includes a trimmer shaft 12, a motor 14 attached to the trimmer shaft 12, and a rotating head 16 supporting a cutting line 18. As is conventional, the rotating head 16 is operatively coupled with the motor 14 for activation under operator control (via a trigger or the like). The motor may be attached at a lower end of the trimmer shaft and/or attached with a speed reducing gearbox.

A glider assembly 20 is connected to the rotating head 16. FIGS. 2-6 show variations of the glider assembly 20 and its connection to the rotating head 16. It will be appreciated that any suitable structure may be used to connect the glider assembly 20 and the rotating head 16. It is contemplated that the glider assembly 20 is free-spinning and disconnected from influence by the rotating head. In the preferred embodiments, this is achieved through the use of one or more bearings.

In the exemplary configurations shown in FIGS. 2-6, FIGS. 2, 3 and 6 show a single bearing system, and FIGS. 4 and 5 show a double bearing system. The glider assembly includes a glider shaft 22 coupleable at one end with the rotating head 16. A glider plate 24 is connected to an opposite end of the glider shaft 22. As shown in the drawings, the glider plate 24 is part-spherical or saucer shaped and includes a concave side and a convex side. The convex side is the ground side—i.e., the side of the glider plate 24 that is intended to engage the ground during use. A bearing 26 acts between the glider plate 24 and the glider shaft 22. The glider plate 24 is preferably plastic but can be made with any suitable rigid or flexible material.

Figure 2:
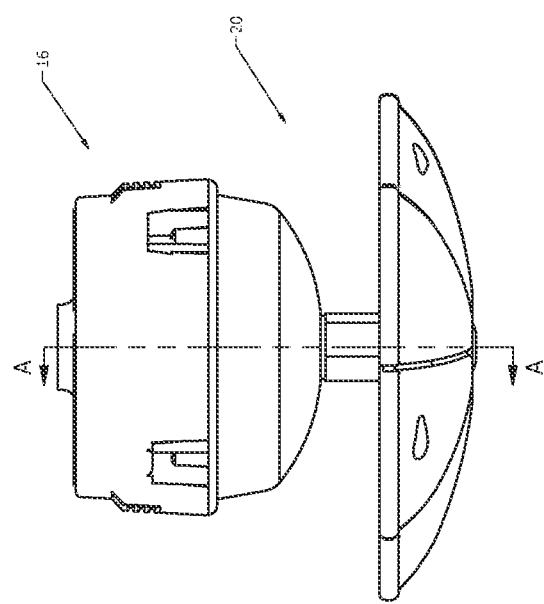
Figure 3A:
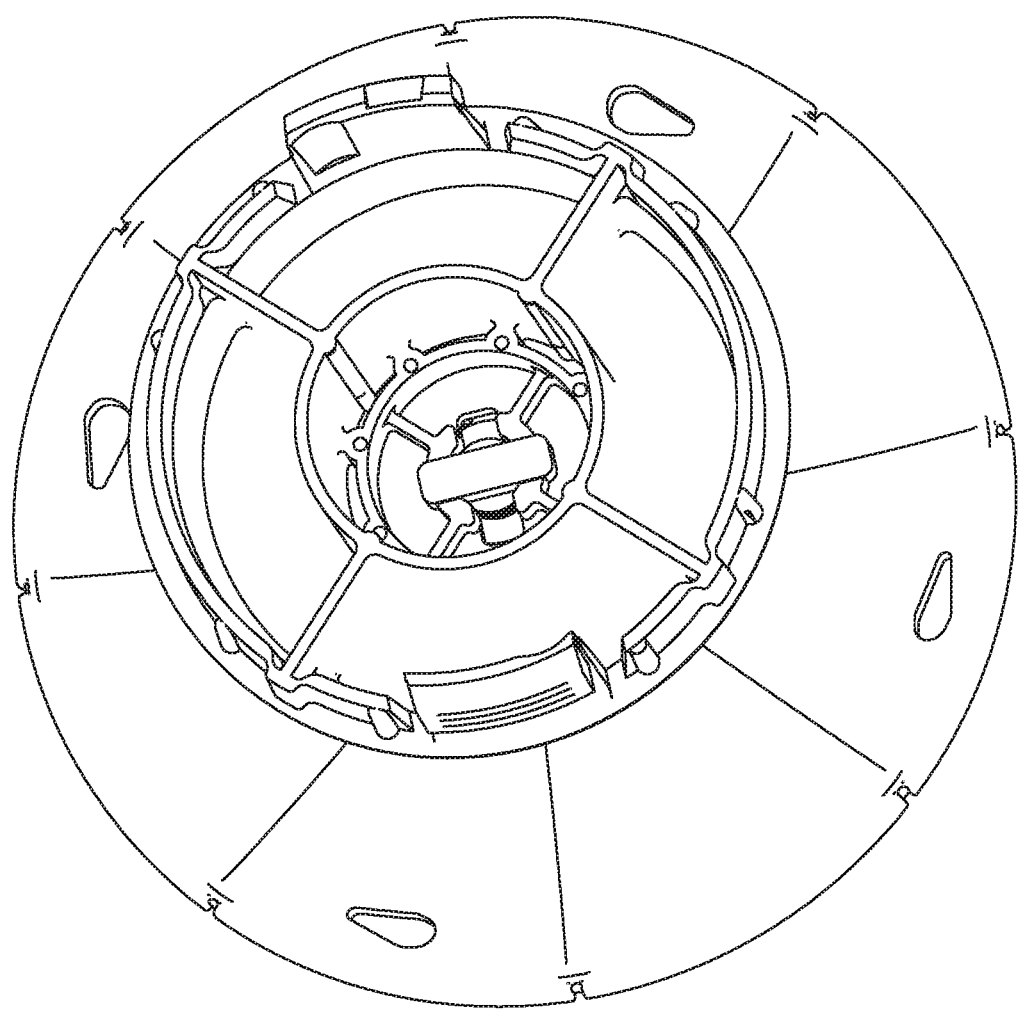
Figure 6A:
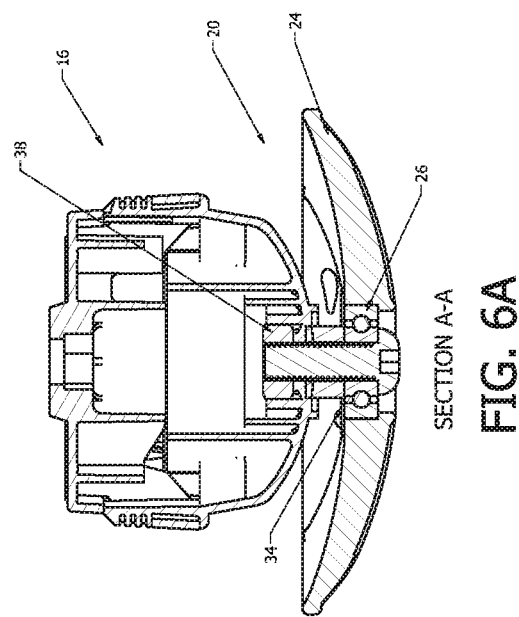
FIGS. 6, 6A and 6B show a single bearing system with a captive nut.
Figure 6:
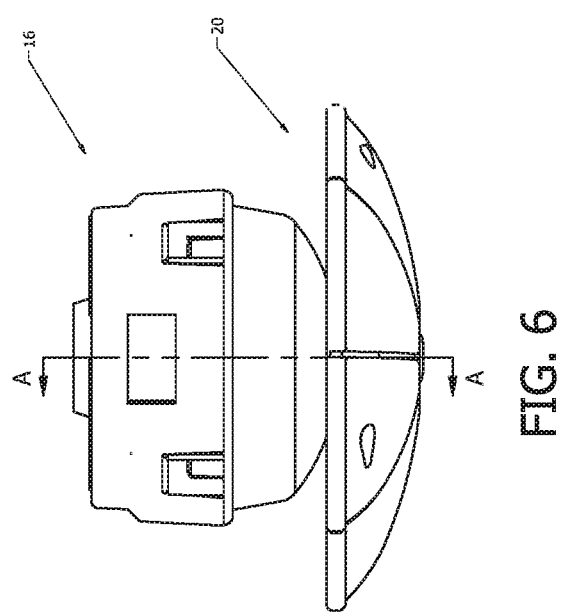
Figure 6B:
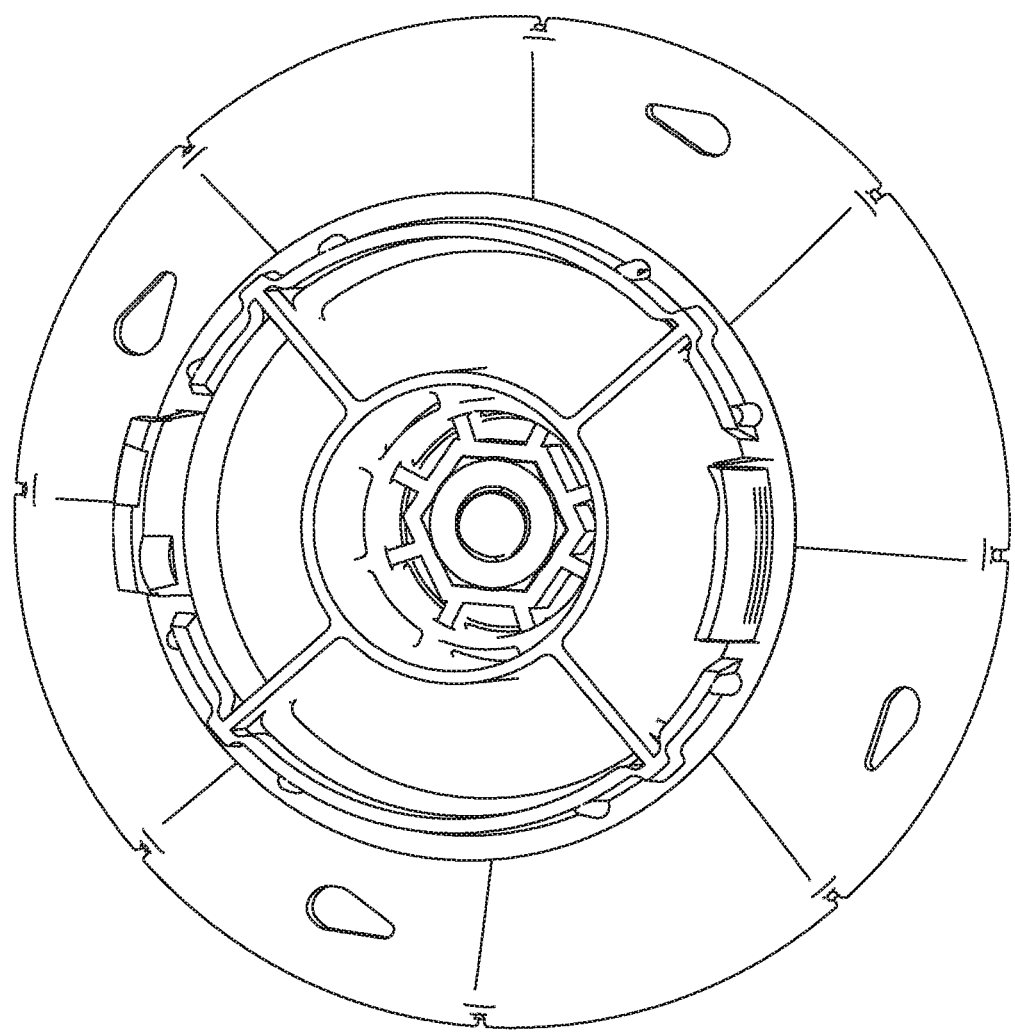

In the embodiment shown in FIGS. 2 and 3, the glider shaft 22 includes an internally threaded sleeve 28, a connecting bolt 30 and a quick-connect bolt 32. The glider plate 24 includes a channel 34 that houses the bearing 26. The channel 34 may be an integral channel defined by an integral flange 35. The connecting bolt 30 is threaded into the sleeve 28 through an opening in the bearing 26. The quick-connect bolt 32 is threaded into an opposite end of the sleeve 28. The rotating head 16 is provided with a suitably shaped opening 36 for a quick-connect coupling engagement with the quick-connect bolt 32. In an exemplary embodiment, the quick-connect bolt 32 is a T-shaped bolt that can be inserted through the opening 36 in the rotating head 16 and rotated 90° to secure the quick-connect bolt 32 in a suitable seat or other engaging structure as shown in FIG. 3A. The connection can be easily released by reversing the inserting operation. Another embodiment would include a nut embedded within a nut pocket (FIG. 6A) within the cap that connects to the head 16, and further connects to a threaded bolt 22 as used in FIG. 6. The bearing 26 enables the glider plate 24 to be free-spinning and disconnected from influence by the rotating head 16 during operation.

In the embodiment shown in FIGS. 4 and 5, a bearing set includes a first bearing 261 and a second bearing 262. The first bearing 261 is secured to the glider plate 24 in a channel 34 or the like and is coupled with the glider shaft 22. The second bearing 262 is secured to the rotating head 16 and is similarly coupled with the glider shaft 22. In this embodiment, the glider shaft 22 is a threaded bolt that extends through the glider plate 24 and through the first bearing 261 into a threaded channel 38 (a nut) defined in the rotating head 16 and through the second bearing 262. This structure similarly provides for the glider plate 24 to be free-spinning and disconnected from influence by the rotating head 16.

The glider plate 24 is selectively positionable relative to the rotating head to adjust a cutting height of the cutting line. A third threaded channel 38 (nut) can be placed before bearing 262 for height adjustment to raise or lower the cutting height between the base of the glider and the line blade cutting plane. The middle threaded channel 38 (nut) can be removed to lower the upper bearing 261 to be tightened or clamped directly to the lower threaded channel 38 (nut), or directly onto an unthreaded channel (a spacer). In all cases, the upper threaded channel 38 (nut) is tightened onto bearing 262 to clamp or sandwich the assembly together.

In use, the glider assembly 20 including the glider plate 24 is configured to support a portion of the weight of the handheld trimmer. That is, the user can operate the handheld trimmer with weight relief from the trimmer set on the ground supported by the glider assembly 20. Since the glider plate 24 is free-spinning and disconnected from influence by the rotating head, it is easy for the operator to control a position of the trimmer in use. Also, by virtue of the shape of the glider plate 24, the assembly is easily slidable over the surface to which the trimming operation is being subjected.

Figure 7A:
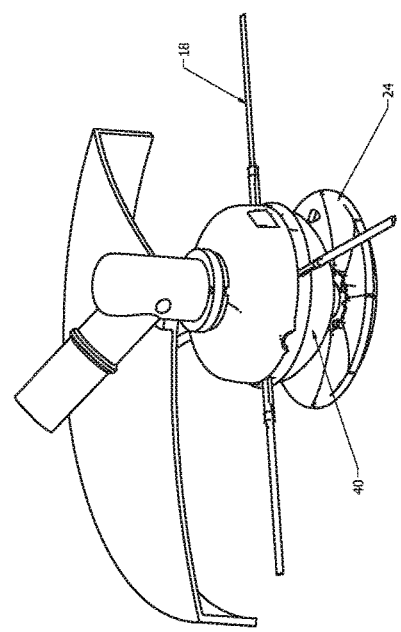
FIGS. 7 and 7A show an embodiment utilizing a convertible cap.
Figure 7:
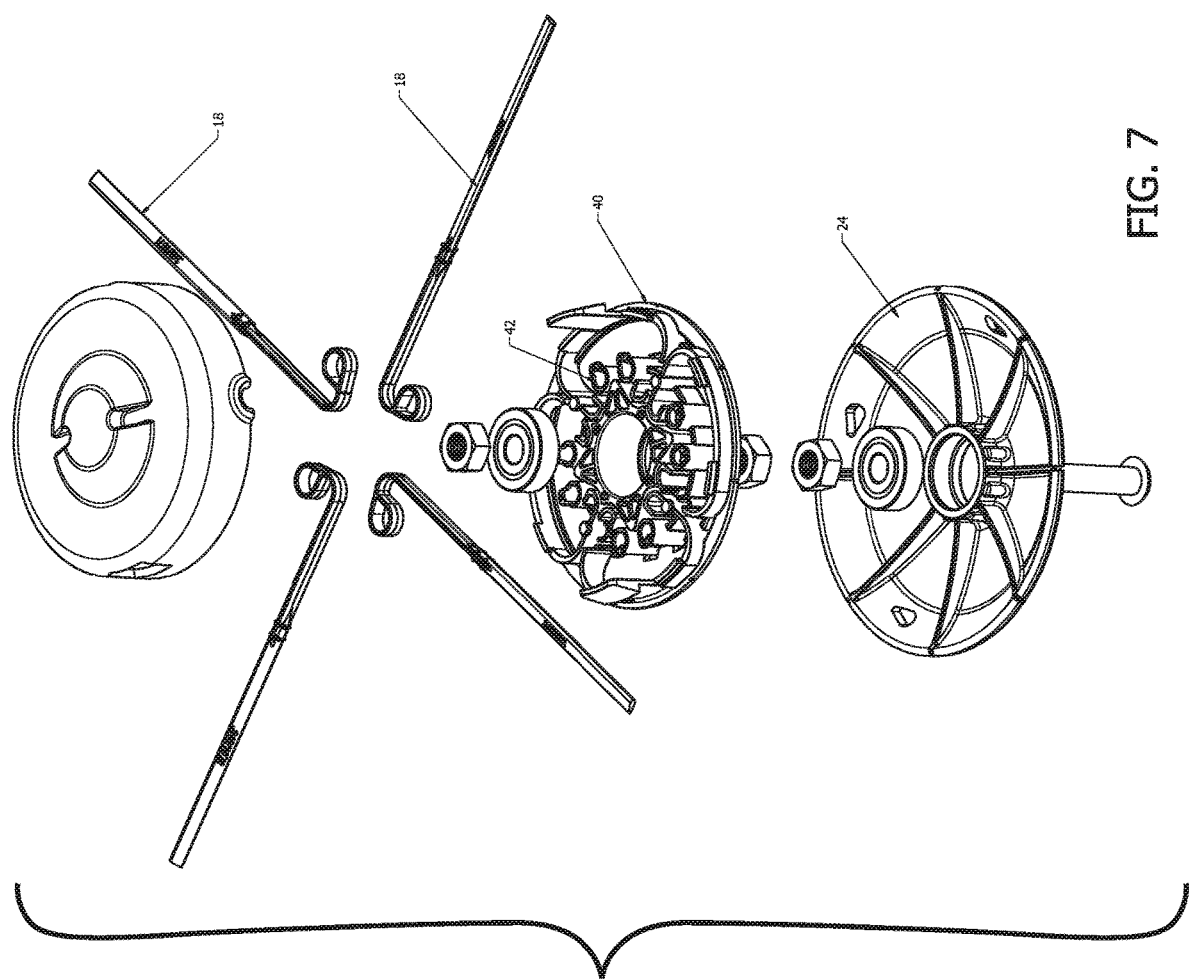

As discussed above, operation of the trimmer can be enhanced with the use of the shaped or molded line blades. Exemplary blades are described in U.S. Pat. No. 6,314,848, the contents of which are hereby incorporated by reference. Molded line blades are functional at much lower blade tip speeds (14,000-21,000 ft./min). As a consequence, a motor with less than 1 HP may be used, and the motor may be battery powered. Additionally, a conversion kit that will enable an operator the option to remove an existing monofilament line system from the same upper head and replace it with an alternative or convertible cap assembly supporting the use of either the original extruded lines, or the noted line blades and the glider assembly. In this context, with reference to FIG. 7, the assembly may include a convertible cap 40 that is attachable directly to the rotating head 16 and disposed between the glider shaft 22 and the rotating head 16 such that the glider shaft 22 is coupleable with the rotating head 16 through the convertible cap 40. The convertible cap 40 includes channels 42 for supporting a molded cutting line 18.

The glider plate may also be suitable for use with a ground supported trimmer as shown in FIG. 8. The ground supported trimmer includes a support leg or framework 44 attached to the trimmer shaft 12. One or more supporting glider plates 46 may be attached to the support leg or framework 44, where the support leg or framework 44 and the supporting glider plate 46 together with the main glider plate 24 define a support base for the handheld trimmer. As shown in FIG. 8, two supporting glider plates 46 are attached to the support leg 44. Alternative constructions may include a single supporting glider plate or a single supporting glider plate with suitable outriggers or the like.

Operation of the handheld trimmer including the glider assembly is conducted by operating the motor 14 to drive the rotating head 16, and setting the glider plate 24 on the ground and supporting a weight of the handheld trimmer on the glider assembly 20. The method may also include setting a cutting height of the cutting line 18 by adjusting a position of the glider plate 24 relative to the rotating head 16. In operating the motor to drive the rotating head, with the use of shaped or molded line blades, the motor may be operated such that a tip speed of the cutting line is 14,000-21,000 ft/min.

A size of the glider plate 24 is preferably configured to minimize sinking forces resulting from the trimmer weight and, in the event of molded aerodynamic line blades, downward air thrust. The sinking forces affect push/pull maneuvering forces of the handheld trimmer. The greater the sinking depth, the greater the operating push/pull forces. The downward air thrusting force created by updraft line blades, unlike monofilament line, creates the benefit of lifting to hold and stiffen the grass for a cleaner cut. The glider assembly helps in the control of the resulting downward air thrusting forces that are otherwise uncontrollable without the glider assembly.

During testing and development, added operator force needed to push the trimmer was observed and experienced while resting on varied glider plate radii. Pushing the trimmer through the grass was affected by how much the glider plate would sink. The sharper radius glider plate would sink deeper, and the push force would increase.

Various dish radius profiles of different and projected areas were tried for the purpose of determining the operator work effort to push the glider through the grass. Push force (Fp) was measured with the Fv downward vertical force (Fv=W1+FA) where W1=Static weight at head end; and FA=downward air thrust from updraft line blades when the line blade head was rotating at 7000 RPM. By applying the same Fv to a 3.5" radius (R2) dish and a 5" (R1) radius dish, the push force of FP2 was 4# and the FP1 was 3#. This 25% difference is significant because hand forces are applied to the upper trimmer handles thus magnifying the difference by distance proportion.

As a consequence, it was discovered that a suitable range for the glider plate radii is 3.5"-7.5", with the most preferable at $R_1=5"$ (a flatter dish) than $R_2=3.5"$. Too much radii (flatter) also binds in the grass, while too little radii sinks deeper to require more push force.

The glider assembly does not allow the trimmer to react or skid due to the elimination of rotational head contact with grass or ground (vertical axis with one or more bearings that disconnect power), which eliminates rotating head contact with ground. Movement of the trimmer head is allowed in all directions with a reasonable push force while gliding directly on the ground. The structure enables the trimmer to mow and trim in one pass and eliminates side interference of wheels of conventional walk-behind mowers as the line blades now cut and mow beyond the unit's ground support (no outer wheels). Operators can more easily manually control the plane of the line blades to level mow along flat or irregular slopes and contours, and the resulting trimmer is generally simple to hold a parallel line plane to the contour of the ground.

Additionally, the operator can tilt the cutting plane on the curved base of the glider to mow to the more intricate shapes and contours of the ground being mowed. Line blades enable mowing with controlled thrust forces from updraft that provides grass lift, which tightens the grass for a cleaner quality cut along with the sharper side of the shaped line blade.

The assembly does not prevent the trimmer from being utilized as a handheld trimmer. There is no glider assembly interference to handheld trimming. The assembly maintains its power disconnect with its adjustable height control settings.

Although Aero-Flex® line blades are preferable, improved performance with conventional monofilament line is also achieved. The design can be successfully used with conventional mono line bump advancers to minimize harmful grass scalping. Precision positioning can be easily controlled when mowing and trimming up to hard objects with line blade visual plane control. Line blades in combination with the glider assembly can effectively mow and trim at tip speeds well below the tip speeds where conventional line is very weak and can hardly perform cutting. Line blades can be mounted with the option of the aerodynamic edge as the leading edge for lower drag, or mounted with the option of the sharp end of the elongated cutter profile as the leading edge for cleaner/sharper cutting. The design also reduces line wear by keeping the line plane above the abrasive and damaging ground levels.

The glider assembly enables much better control of the trimmer from undesirable scalping or skidding. It provides for controlled tilt, even mowing height and control of downward forces due to trimmer weight and downward thrust forces due to updraft. There are also safety benefits with an opened mower deck—mowing with a flexible line blade instead of a solid metal blade, reduced thrown objects, and a visually exposed line blade to control its position away from harmful objects. The assembly enables control of the trimmer in all directions over all contours and steep slopes—forward, reverse, side to side. The glider assembly eliminates conventional rotary mower power needed to discharge cuttings through a lawn mower discharge chute because it eliminates the need for a mower blade deck shield that must have a discharge chute. The same power reduction benefits apply to a hover mower, which needs enormous power to lift its heavy weight so as to enable its rim (without wheels) to 'hover' and glide in all directions from side to side. New trimming methods and techniques from a handheld trimmer's or brushcutter's swinging arc to a more optional, multi-directional movement along the ground surface to be trimmed or mowed provide additional improvement. Also, assembly results in added protection of the flexible cutting member, which will reduce abrasion wear of both the head and cutting lines due to a higher controlled elevation above the ground where debris and damaging objects lay. The design provides for an effective lift of the line blade cutting plane above impediments and loose debris to reduce probability and velocity of thrown objects. The operator can tilt the head on the profiled dish radius so the line plane can achieve closer to the ground trimming and even further into a controlled scalping height position when desired.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A handheld trimmer comprising:
a trimmer shaft;
a motor attached to the trimmer shaft;
a rotating head assembly including a rotating head coupled with the motor and attached to the trimmer shaft, the rotating head supporting a cutting line or blade; and
a glider assembly connected to the rotating head assembly, the glider assembly including:
a glider shaft connected at one end directly with a rotating component of the rotating head assembly such that the glider shaft rotates with the rotating component,
a main glider plate connected to an opposite end of the glider shaft, the main glider plate being a spherical cap and including a concave side and a convex side, and
a bearing acting between the main glider plate and the glider shaft, wherein the bearing is structured and cooperable with the main glider plate such that the main glider plate is free spinning at all times,
wherein the rotating head assembly is independent of the glider assembly, wherein the main glider plate is spaced from the rotating head assembly in a direction along a rotation axis of the rotating head by the glider shaft, and wherein ends of the glider shaft extend into and terminate adjacent the rotating head assembly and adjacent the glider plate, respectively.

2. A handheld trimmer according to claim 1, wherein the main glider plate is configured to support a weight of the handheld trimmer during operation of the handheld trimmer.

3. A handheld trimmer according to claim 1, further comprising a support leg attached to the trimmer shaft and a supporting glider plate attached to the support leg, the support leg and supporting glider plate together with the main glider plate define a support base for the handheld trimmer.

4. A handheld trimmer according to claim 3, comprising two supporting glider plates attached to the support leg.

5. A handheld trimmer according to claim 1, wherein the main glider plate is selectively positionable relative to the rotating head assembly to adjust a cutting height of the cutting line.

6. A handheld trimmer according to claim 1, wherein the cutting line comprises molded or shaped cutting line or blade.

7. A handheld trimmer according to claim 6, wherein the motor is less than 1 HP and is battery powered.

8. A handheld trimmer according to claim 1, wherein the bearing comprises a bearing set including a first bearing and a second bearing, the first bearing being secured to the glider plate and coupled with the glider shaft, and the second bearing being disposed within the rotating head assembly coupled with the glider shaft and spaced from the first bearing.

9. A glider assembly for a handheld trimmer including a rotating head that supports a cutting line or blade, the glider assembly comprising:
- a glider shaft;
- a glider plate connected to distal end of the glider shaft, the glider plate being a spherical cap and including a concave side and a convex side;
- a convertible cap attachable directly to the rotating head and disposed between the glider shaft and the rotating head such that the glider shaft is coupleable with the rotating head through the convertible cap and rotates with the rotating head, wherein the convertible cap includes channels for supporting the cutting line or blade; and
- a bearing acting between the glider plate and the glider shaft, wherein the bearing is structured and cooperable with the glider plate such that the glider plate is free spinning at all times,
- wherein the glider shaft comprises a threaded connector, and wherein the bearing is secured to the glider plate and coupled with the distal end of the glider shaft, the threaded connector extending through the bearing in the glider plate and into the convertible cap, and
- wherein the glider plate is spaced from the convertible cap in a direction along a rotation axis of the rotating head by the glider shaft.

10. A glider assembly according to claim 9, wherein the one end of the glider shaft comprises a quick connect coupling engageable with a corresponding coupling on the rotating head.

11. A glider assembly for a handheld trimmer including a rotating head, the glider assembly comprising:
- a glider shaft coupleable at one end directly with the rotating head such that the glider shaft rotates with the rotating head;
- a glider plate connected to an opposite end of the glider shaft, the glider plate including a concave interior side facing the rotating head and a convex exterior side on an opposite side, wherein the glider plate includes an integral bearing channel adjacent the concave interior side, the integral bearing channel being defined by an integral flange extending from the concave interior side of the glider plate; and
- a bearing secured in the bearing channel and acting between the glider plate and the glider shaft; and
- a convertible cap attachable directly to the rotating head and disposed between the glider shaft and the rotating head such that the glider shaft is coupleable with the rotating head through the convertible cap and is rotatable with the rotating head, wherein the convertible cap includes channels for supporting a cutting line or blade.

12. A glider assembly according to claim 11, wherein the bearing channel includes shoulders, and wherein the bearing is supported on the shoulders of the bearing channel.

13. A glider assembly according to claim 11, wherein the bearing channel defines a central opening in the glider plate and a recess in the convex side of the glider plate, the glider assembly further comprising a threaded connector threaded through the bearing into the glider shaft, wherein a proximal end of the threaded connector is at least partially positioned with the recess.

14. A handheld trimmer according to claim 1, wherein the main glider plate includes an integrated bearing channel adjacent the concave side, and wherein the bearing is secured in the bearing channel.

* * * * *